United States Patent
Satow et al.

(10) Patent No.: US 9,362,550 B2
(45) Date of Patent: Jun. 7, 2016

(54) NEGATIVE ELECTRODE FOR LITHIUM ION SECONDARY BATTERIES AND METHOD FOR PRODUCING THE NEGATIVE ELECTRODE, AND LITHIUM ION SECONDARY BATTERY

(71) Applicant: PANASONIC CORPORATION, Osaka (JP)

(72) Inventors: Taiki Satow, Hyogo (JP); Shinji Kasamatsu, Hyogo (JP); Masaya Ugaji, Tokushima (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 152 days.

(21) Appl. No.: 14/360,428

(22) PCT Filed: Nov. 22, 2012

(86) PCT No.: PCT/JP2012/007542
§ 371 (c)(1),
(2) Date: May 23, 2014

(87) PCT Pub. No.: WO2013/076996
PCT Pub. Date: May 30, 2013

(65) Prior Publication Data
US 2014/0308582 A1    Oct. 16, 2014

(30) Foreign Application Priority Data
Nov. 25, 2011    (JP) .................................. 2011-257577

(51) Int. Cl.
*H01M 4/133*    (2010.01)
*H01M 4/139*    (2010.01)
(Continued)

(52) U.S. Cl.
CPC ................ *H01M 4/133* (2013.01); *H01M 4/13* (2013.01); *H01M 4/139* (2013.01); *H01M 2004/021* (2013.01); *H01M 2004/027* (2013.01); *Y02E 60/122* (2013.01); *Y02P 70/54* (2015.11)

(58) Field of Classification Search
None
See application file for complete search history.

(56) References Cited

U.S. PATENT DOCUMENTS

| | | |
|---|---|---|
| 2005/0208379 A1 | 9/2005 | Musha et al. |
| 2006/0051675 A1 | 3/2006 | Musha et al. |

(Continued)

FOREIGN PATENT DOCUMENTS

| | | |
|---|---|---|
| EP | 1 566 855 A1 | 8/2005 |
| EP | 1 617 497 A1 | 1/2006 |

(Continued)

OTHER PUBLICATIONS

International Search Report issued in International Application No. PCT/JP2012/007542 with Date of mailing Feb. 19, 2013, with English Translation.

*Primary Examiner* — Sarah A Slifka
(74) *Attorney, Agent, or Firm* — McDermott Will & Emery LLP (57) ABSTRACT

Provided is a negative electrode for lithium ion secondary batteries, which can enhance the penetration of non-aqueous electrolyte, and can improve the input-output characteristics. The negative electrode includes a negative electrode core material sheet, and a negative electrode material mixture layer supported thereon. The negative electrode material mixture layer includes negative electrode active material particles, and a binder. The negative electrode material mixture layer has a plurality of pores interspersed on the surface and in the interior of the negative electrode material mixture layer. The pores have an average maximum diameter R of 45 to 125 μm. The pores have a number density of 8 to 17 pores per 1 $cm^2$ of the surface of the negative electrode material mixture layer or per 1 $cm^2$ of a cross section in the plane direction of the negative electrode material mixture layer.

10 Claims, 2 Drawing Sheets

(51) Int. Cl.
*H01M 4/13* (2010.01)
*H01M 4/02* (2006.01)

(56) References Cited

U.S. PATENT DOCUMENTS

| | | |
|---|---|---|
| 2006/0115735 A1 | 6/2006 | Yasuda et al. |
| 2007/0231690 A1 | 10/2007 | Fujita et al. |
| 2011/0020709 A1 | 1/2011 | Fukumine et al. |
| 2012/0064415 A1 | 3/2012 | Satow et al. |
| 2012/0321947 A1 | 12/2012 | Goto et al. |

FOREIGN PATENT DOCUMENTS

| | | |
|---|---|---|
| JP | 11-154508 A | 6/1999 |
| JP | 2005-044672 A | 2/2005 |
| JP | 2007-273166 A | 10/2007 |
| JP | 2007-311328 A | 11/2007 |
| JP | 2008-010253 A | 1/2008 |
| JP | 2010-238365 A | 10/2010 |
| JP | 2013-020820 A | 1/2013 |
| WO | 2004/051768 A1 | 6/2004 |
| WO | 2004/095612 A1 | 11/2004 |
| WO | 2009/096528 A1 | 8/2009 |
| WO | 2011/036759 A1 | 3/2011 |
| WO | 2011/121902 A1 | 10/2011 |

NEGATIVE ELECTRODE FOR LITHIUM ION SECONDARY BATTERIES AND METHOD FOR PRODUCING THE NEGATIVE ELECTRODE, AND LITHIUM ION SECONDARY BATTERY

RELATED APPLICATIONS

This application is a national phase of International Application No. PCT/JP2012/007542, filed on Nov. 22, 2012, which in turn claims the benefit of Japanese Application No. 2011-257577, filed on Nov. 25, 2011, the disclosures of which Applications are incorporated by reference herein.

TECHNICAL FIELD

The present invention relates to a negative electrode for lithium ion secondary batteries, and specifically relates to an improvement of a negative electrode material mixture layer including negative electrode active material particles, of the negative electrode for lithium ion secondary batteries.

BACKGROUND ART

Lithium ion secondary batteries are provided with positive and negative electrodes which absorb and release lithium ions, a separator interposed therebetween, and a non-aqueous electrolyte. The negative electrode usually includes a negative electrode core material sheet such as copper foil, and a negative electrode material mixture layer supported on a surface thereof. Such a negative electrode is formed by, for example, applying a negative electrode material mixture slurry including a negative electrode active material and a binder onto a surface of a negative electrode core material sheet, followed by drying, and then pressing between rolls. The pressing increases the density of the negative electrode material mixture layer. The negative electrode material mixture slurry is prepared by, for example, dispersing negative electrode active material particles and a binder in a dispersion medium such as water.

In lithium ion secondary batteries, grooves or cup-shaped recesses have been formed on a surface of the active material layer in order to solve various problems.

For example, Patent Literature 1 discloses forming grooves or cup-shaped recesses by pressing a die to a surface of the active material layer. When a lithium ion secondary battery is used continuously at high temperatures, the separator is softened, and the protrusions and recesses on its surface are deformed, resulting in reduced space for retaining non-aqueous electrolyte, and thus in deteriorated high-output characteristics. Patent Literature 1 teaches that this problem can be solved by the above method.

Patent Literature 2 discloses forming grooves which extend to the edges of the surface, on a surface of the active material layer, so that penetration of non-aqueous electrolyte into the electrode group during production can be improved. Such grooves for improving penetration of non-aqueous electrolyte into the electrode group, however, reduce the strength of the electrode. Patent Literature 3 discloses forming lattice-like grooves on a surface of the active material layer, for the purpose of solving this problem.

CITATION LIST

Patent Literature

[PTL 1] Japanese Laid-Open Patent Publication No. 2008-10253
[PTL 2] Japanese Laid-Open Patent Publication No. H11-154508
[PLT 3] Japanese Laid-Open Patent Publication No. 2007-311328

SUMMARY OF INVENTION

Technical Problem

The negative electrode material mixture layer pressed between rolls, in which the negative electrode active material is highly densely packed, can increase the negative electrode capacity to some extent. However, due to the increased packing density of the negative electrode active material, the penetration of non-aqueous electrolyte tends to be reduced.

In Patent Literatures 1 to 3, recesses or grooves are formed on a surface of the negative electrode material mixture layer. Such recesses and grooves allow non-aqueous electrolyte to be reliably retained at the surface of the negative electrode material mixture layer to some extent, but are insufficient for improving the penetration thereof into the layer. When the recesses or grooves are formed by die-pressing or the like, the negative electrode active material becomes more densely packed, which causes the penetration of non-aqueous electrolyte into the negative electrode material mixture layer to tend to be reduced. Consequently, the input-output characteristics (or discharge load characteristics) become likely to degrade.

Furthermore, when the active material is highly densely packed in the negative electrode material mixture layer, the stress applied to the negative electrode active material by roll-pressing or die-pressing is difficult to be reduced. To the negative electrode active material with a large stress being applied thereto, stress associated with absorption and release of lithium ions is further applied during battery charge and discharge. As a result, the negative electrode active material particles are cracked or crushed, or the negative electrode material mixture layer falls off. Consequently, the charge-discharge characteristics become likely to degrade.

Moreover, in recent years, as the devices incorporating lithium ion secondary batteries become smaller in size and higher in functionality, lithium ion secondary batteries have been required to be smaller in size and have a higher capacity. In order to realize such batteries, it has been examined to increase the density of the negative electrode active material which influences the battery capacity.

Specifically, with regard to, for example, a negative electrode including a negative electrode core material sheet, and a negative electrode material mixture layer which is supported on a surface thereof and contains a carbonaceous material as a negative electrode active material, it has been attempted to further increase the packing density (apparent density) of the negative electrode material mixture layer, which conventionally is about 1.3 to 1.4 g/cm$^3$. Note that in a lithium ion secondary battery, in which the negative electrode capacity is usually larger than the positive electrode capacity, the positive electrode capacity regulates the battery capacity.

Further increasing the packing density of the negative electrode material mixture layer, however, further reduces the penetration of non-aqueous electrolyte into the negative electrode material mixture layer, and damages the input-output characteristics.

Solution to Problem

The present invention intends to provide a negative electrode for lithium ion secondary batteries, which can enhance the penetration of non-aqueous electrolyte into the negative electrode material mixture layer, and can improve the input-output characteristics.

One aspect of the present invention relates to a negative electrode for lithium ion secondary batteries. The negative electrode includes a negative electrode core material sheet, and a negative electrode material mixture layer supported on the negative electrode core material sheet. The negative electrode material mixture layer includes negative electrode active material particles, and a binder. The negative electrode material mixture layer has a plurality of pores interspersed on a surface and in an interior of the negative electrode material mixture layer. The pores have an average maximum diameter R of 45 to 125 µm. The pores have a number density of 8 to 17 pores per 1 cm$^2$ of the surface of the negative electrode material mixture layer or per 1 cm$^2$ of a cross section in a plane direction of the negative electrode material mixture layer.

Another aspect of the present invention relates to a method for producing a negative electrode for lithium ion secondary batteries. The method includes: preparing a negative electrode material mixture slurry including negative electrode active material particles, a binder, and a dispersion medium containing at least water; applying the negative electrode material mixture slurry onto a negative electrode core material sheet, to form an applied film; drying the applied film by heating; and pressing the applied film after drying, to form a negative electrode material mixture layer supported on the negative electrode core material sheet. The binder includes a sodium salt of carboxymethyl cellulose. The sodium salt of carboxymethyl cellulose has a degree of etherification of 0.23 to 0.7, and an average degree of polymerization of 20 to 1600.

Yet another aspect of the present invention relates to a lithium ion secondary battery including a positive electrode, the aforementioned negative electrode, a separator interposed between the positive electrode and the negative electrode, and a non-aqueous electrolyte.

Advantageous Effects of Invention

According to the present invention, it is possible to provide a negative electrode and a lithium ion secondary battery configured to enhance the penetration of non-aqueous electrolyte into the negative electrode material mixture layer and improve the input-output characteristics (discharge load characteristics) of lithium ion secondary batteries.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Negative Electrode for Lithium Ion Secondary Batteries

A negative electrode for lithium ion secondary batteries of the present invention includes a negative electrode core material sheet, and a negative electrode material mixture layer supported on the negative electrode core material sheet. The negative electrode material mixture layer includes negative electrode active material particles, and a binder. The negative electrode material mixture layer has a plurality of pores interspersed on the surface and in the interior thereof. The pores have an average maximum diameter R of 45 to 125 µm. The pores have a number density of 8 to 17 pores per 1 cm$^2$ of the surface or a cross section in the plane direction of the negative electrode material mixture layer.

Due to the presence of such pores, in the present invention, the penetration of non-aqueous electrolyte into the negative electrode material mixture layer can be improved, and thereby the battery input-output characteristics (discharge load characteristics) can be improved. Moreover, since the pores serve as a reservoir for non-aqueous electrolyte, the ability to retain non-aqueous electrolyte (electrolyte retentivity) at the surface and in the interior of the negative electrode material mixture layer can be significantly improved. This eases the movement of lithium within the negative electrode, and thus improves the battery charge-discharge characteristics. Therefore, even when the negative electrode active material is highly densely packed in the negative electrode material mixture layer (i.e., a higher battery capacity is achieved), the penetration of non-aqueous electrolyte can be kept good, allowing to maintain excellent input-output characteristics.

The pores formed on the surface of the negative electrode material mixture layer are also referred to as "recesses" each having an opening at the surface of the negative electrode material mixture layer. The pores formed in the interior of the negative electrode material mixture layer are also referred to as "voids". In short, the pores include a plurality of recesses interspersed on the surface of the negative electrode material mixture layer, and a plurality of voids interspersed in the interior of the negative electrode material mixture layer.

When, as disclosed in Patent Literature 1, a negative electrode material mixture layer is formed first, and then, recesses are formed on the surface thereof by pressing a die to the surface, a high pressure is locally applied to the negative electrode material mixture layer. This may lead to a local increase in the density, or cause cracks or deformation in the negative electrode active material particles.

On the other hand, in the present invention, the pores are formed during drying of an applied film of negative electrode material mixture slurry. In other words, in the present invention, unlike in Patent Literature 1, homogeneous pores (specifically, recesses and voids) can be formed without applying pressure. Due to the presence of the pores formed in such a way, the stress applied to the negative electrode active material particles can be considerably reduced.

Moreover, the negative electrode material mixture layer has not only pores (recesses) on the surface but also pores (voids) in the interior. Therefore, the stress associated with changes in volume of the negative electrode active material particles during charge and discharge can be effectively reduced. This can suppress the cracks or crush of the negative electrode active material particles, and separation and falling-off of the negative electrode material mixture layer. In other words, this can enhance the strength and the durability of the negative electrode material mixture layer.

Figure 1:
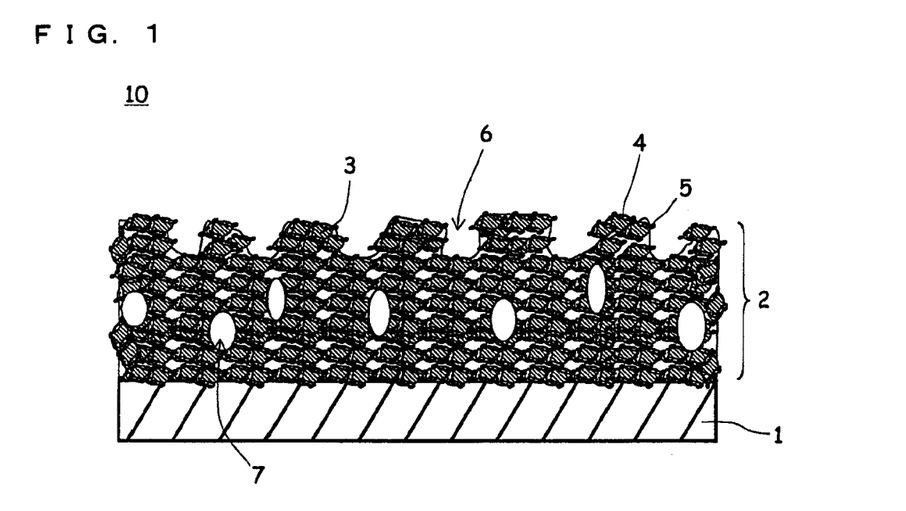
FIG. 1 A schematic cross-sectional view illustrating a negative electrode for lithium ion secondary batteries according to one embodiment of the present invention FIG. 2 A partially cut-away oblique view illustrating a prismatic lithium ion secondary battery according to one embodiment of the present invention

Referring to FIG. 1, a description is given of a negative electrode 10 for lithium ion secondary batteries, which is one embodiment of a negative electrode for lithium ion secondary batteries (hereinafter sometimes simply referred to as a "negative electrode") of the present invention.

FIG. 1 is a schematic cross-sectional view of the negative electrode 10 for lithium ion secondary batteries.

The negative electrode 10 includes a negative electrode core material sheet 1, and a negative electrode material mixture layer 2 formed on a surface of the negative electrode core material sheet 1. The negative electrode material mixture layer 2 includes negative electrode active material particles 3, and a binder. The negative electrode material mixture layer 2 has pores (recesses) 6 on its surface, and pores (voids) 7 in its interior. In FIG. 1, the binder includes a sodium salt of carboxymethyl cellulose (CMC-Na) 4, and rubber particles 5.

In the negative electrode 10, the recesses 6 are interspersed uniformly on the surface of the negative electrode material mixture layer 2, and the voids 7 are interspersed uniformly in the interior of the negative electrode material mixture layer 2. The pores such as the recesses 6 and the voids 7 improve the penetration of non-aqueous electrolyte, and serve as a reservoir for non-aqueous electrolyte.

The pores has an average maximum diameter R of 45 µm or more, preferably 50 µm or more, and more preferably 60 µm or more (e.g., 65 µm or more). The average maximum diameter R is 125 µm or less (e.g., 105 µm or less), preferably 100 µm or less (e.g., 90 µm or less), and more preferably 80 µm or less (e.g., 70 µm or less). These lower limits and upper limits can be appropriately selected and combined. The average maximum diameter R may be 45 to 125 µm, preferably 50 to 100 µm, and more preferably 50 to 70 µm.

When the average maximum diameter R is less than 45 λm, sufficient penetration or retentivity of non-aqueous electrolyte cannot be obtained, causing the input-output characteristics to degrade. When the average maximum diameter R is more than 125 µm, the capacity is likely to be reduced because the region occupied by negative electrode active material particles becomes small. Moreover, the strength of the negative electrode material mixture layer is likely to be lowered.

The average maximum diameter R can be evaluated in terms of an average maximum diameter $R_1$ of the openings of the recesses at the surface of the negative electrode material mixture layer, or an average maximum diameter of the voids (an average maximum diameter $R_2$ of the voids on a cross section in the plane direction of the negative electrode material mixture layer).

It suffices if either the average maximum diameter $R_1$ of the openings of the recesses or the average maximum diameter $R_2$ of the voids is in the above range of the average maximum diameter R. Preferably, both of them are in the above range of the average maximum diameter R.

The pores are interspersed all over the surface and the interior of the negative electrode material mixture layer. The pores have a number density of 8 pores or more, preferably 9 pores or more, and more preferably 10 pores or more, per 1 cm² of the surface of the negative electrode material mixture layer or per 1 cm² of a cross section in the plane direction thereof. The number density is 17 pores or less, preferably 16 pores or less, and more preferably 15 or less. These lower limits and upper limits can be appropriately selected and combined. The pore number density may be 8 to 17 pores, and preferably 10 to 15 pores.

When the pore number density is less than 8 pores, sufficient penetration or retentivity of non-aqueous electrolyte cannot be obtained, causing the input-output characteristics to degrade. When the number density is more than 17 pores, the capacity is likely to be reduced because the region occupied by the negative electrode active material particles becomes small. Moreover, the strength of the negative electrode material mixture layer is likely to be lowered.

The number density of the pores at the surface of the negative electrode material mixture layer is a number density of the recesses at the surface of the negative electrode material mixture layer. The number density of the pores at a cross section (a cross section in the plane direction) of the negative electrode material mixture layer is a sum of the number densities of the recesses and voids; while a number density of the pores at a cross section of the negative electrode material mixture layer taken near the negative electrode core material sheet may be regarded as the number density of the voids.

The pores have an average maximum length L in the thickness direction of the negative electrode material mixture layer of, for example, 45 µm or more, preferably 50 µm or more (e.g., 60 µm or more), and more preferably 65 µm or more (e.g., 70 µm or more). The average maximum length L is, for example, 125 µm or less (e.g., 105 µm or less), preferably 100 µm or less (e.g., 90 µm or less), and more preferably 80 µm or less. These lower limits and upper limits can be appropriately selected and combined. The average maximum length L may be preferably 45 to 125 µm (e.g., 50 to 100 µm), more preferably 60 to 90 µm, or 70 to 80 µm.

When the average maximum length L is less than 45 µm, penetration or retentivity of non-aqueous electrolyte becomes insufficient. When the average maximum length L is more than 125 µm, the capacity is likely to be reduced because the region occupied by the negative electrode active material particles becomes small. Moreover, the strength of the negative electrode material mixture layer is likely to be lowered.

The average maximum length L of the pores in the thickness direction of the negative electrode material mixture layer can be evaluated in terms of an average maximum depth H of the recesses, and/or an average maximum length $L_2$ of the voids. It suffices if either the average maximum depth H of the recesses or the average maximum length $L_2$ of the voids is in the above range of the average maximum length L. It also suffices if both of them are in the above range of the average maximum length L.

The average maximum length L of the pores (e.g., the average maximum depth H of the recesses, and/or the average maximum length $L_2$ of the voids) can be determined from a scanning electron microscope (SEM) image of a cross section in the thickness direction of the negative electrode material mixture layer. Specifically, for example, a plurality of (e.g., 200) pores (recesses and/or voids) are randomly selected on the SEM image, and the maximum lengths of the pores in the thickness direction of the negative electrode material mixture layer are measured. An average of the measured values is calculated as the average maximum length L of the pores.

The average maximum diameter R of the pores (the average maximum diameters $R_1$ and $R_2$) can be determined from an SEM image of the surface or a cross section in the plane direction of the negative electrode material mixture layer. Specifically, for example, a plurality of (e.g., 200) pores are randomly selected on an SEM image of the surface or a cross section in the plane direction of the negative electrode material mixture layer, and the maximum diameters of the pores (the maximum diameters of the openings of the recesses or the maximum diameters of the pores at the cross section) are measured. An average of the measured values is calculated as the average maximum diameter R.

The number density of the pores can be determined by selecting an arbitral region in the size of 1 cm×1 cm on an SEM image of the surface or a cross section in the plane direction of the negative electrode material mixture layer, and counting the number of pores present in the region.

The SEM image of a cross section of the negative electrode material mixture layer can be obtained by fixing the negative electrode material mixture layer with a curing resin, followed by chemical polishing to expose a cross section, and photographing the cross section. The magnification of the SEM is not particularly limited, and may be any magnification that is sufficient enough to observe the pores. For example, it may be about ×100.

In the following, the configuration of the negative electrode is more specifically described.

(Negative Electrode Active Material Particles)

Non-limiting examples of a negative electrode active material constituting the negative electrode active material particles include carbonaceous materials conventionally used as a negative electrode active material in a negative electrode for lithium ion secondary batteries, and alloy-type negative electrode active materials containing silicon and/or tin. Particularly preferred among them are carbonaceous materials having a graphite structure, such as graphite (e.g., natural graphite and artificial graphite), and graphitized mesophase carbon. These negative electrode active materials may be used singly or in combination of two or more.

The carbonaceous material having a graphite structure is preferably one whose diffraction pattern measured by wide-angle X-ray diffractometry has a peak attributed to (101) plane and a peak attributed to (100) plane, in view of the degree of graphitization. In this case, a ratio of an intensity I(101) of the peak attributed to (101) plane to an intensity I(100) of the peak attributed to (100) plane preferably satisfies $0.01<I(101)/I(100)<0.25$, and preferably satisfies $0.08<I(101)/I(100)<0.20$ in view of the battery capacity.

The negative electrode active material particles have an average particle size $R_a$ of, for example, 5 to 40 μm, preferably 14 to 25 μm, and more preferably 16 to 23 μm. A ratio $R_a/L$ of the average particle size $R_a$ of the negative electrode active material particles to the average maximum length L of the pores (e.g., the average maximum depth H of the recesses) is, for example, 0.1 to 0.55, and preferably 0.2 to 0.5.

The average particle size as used herein means a median size ($D_{50V}$) in a volumetric particle size distribution. The average particle size can be measured by, for example, using a laser diffraction-scattering type particle size distribution analyzer (e.g., LA-920 available from Horiba, Ltd., and Microtrac available from Nikkiso Co., Ltd.).

An average degree of sphericity of the negative electrode active material particles such as graphite particles, is, for example, 85% or more, and is preferably 90 to 95%, and more preferably 91 to 94%. The average degree of sphericity is expressed as $4\pi S/L_a^2 \times 100(\%)$, where S is an area of an orthographic projection image of negative electrode active material particle, and $L_a$ is a circumferential length of the orthographic projection image. Preferably, an average value of the degree of sphericity of, for example, 100 negative electrode active material particles selected at random is in the above range.

The negative electrode active material particles have a specific surface area of preferably 3 to 7 m$^2$/g, and more preferably 3.5 to 6.5 m$^2$/g. The specific surface area can be measured by BET method.

When the average particle size, average degree of sphericity and/or specific surface area of the negative electrode active material particles are/is in the range as above, because of their good slipperiness when forming a negative electrode material mixture layer, the negative electrode active material particles can be easily packed at a high density, and the bonding strength in the negative electrode material mixture layer tends to increase.

Examples of the binder include: fluorocarbon resins, such as polyvinylidene fluoride (PVDF); acrylic resins, such as polymethyl acrylate and ethylene-methyl methacrylate copolymer; rubbery materials; cellulose ether compounds (including salts of cellulose ethers), such as carboxymethyl cellulose (CMC), carboxyethyl cellulose (CEC), hydroxyethyl cellulose, and hydroxypropyl methyl cellulose. These binders may be used singly or in combination of two or more.

The negative electrode material mixture layer is formed by drying and pressing an applied film of negative electrode material mixture slurry. In the present invention, the pores are formed during drying of an applied film. In view of forming the pores easily, it is preferable to use a binder which contains at least a component swellable with a dispersion medium included in the slurry. Such a component is swollen with the dispersion medium in the applied film of negative electrode material mixture layer. As the applied film dries, the component releases the dispersion medium and shrinks. This efficiently forms pores having appropriate sizes in the shrunk portions.

Such a component may be selected as appropriate from the aforementioned binders, depending on the type of the dispersion medium. For example, when the dispersion medium is an organic medium, fluorocarbon resins such as PVDF, and acrylic resins can be used. When the dispersion medium is a water-containing medium, water-swellable components (binders) such as cellulose ether compounds are preferred. With cellulose ether compounds, an excellent bonding property can be easily obtained. In addition, since they are suitable for adjusting the viscosity of the negative electrode material mixture slurry, the application workability of the negative electrode material mixture slurry can be easily controlled.

For better bonding property, the binder preferably includes, in addition to the aforementioned component swellable with the dispersion medium, a binder such as a rubbery material. The rubbery material is preferably used in combination with a dispersion medium containing at least water. The binder, therefore, preferably includes, at least, a water-swellable component and a rubbery material.

Among the aforementioned cellulose ether compounds, preferable examples of the water-swellable component are: carboxyalkyl celluloses, such as CMC and CEC; and alkali metal salts of carboxyalkyl celluloses, such as sodium salts of CMC and sodium salts of CEC. The carboxyalkyl group of the carboxyalkyl celluloses is preferably a carboxyC$_{1-4}$alkyl group, and preferably a carboxyC$_{1-3}$alkyl group. Preferable examples of the alkali metal forming the alkali metal salts include sodium and potassium. Preferred among them are CMC and sodium salts of CMC (CMC-Na), and particularly preferred is CMC-Na.

Carboxyalkyl celluloses and salts thereof, such as CMC and CMC-Na have good affinity for water. It is preferable to adjust a degree of etherification and an average degree of polymerization thereof, in order to ensure the bonding property, as well as to effectively form the pores.

Note that, in the present specification, carboxyalkyl celluloses and salts thereof are sometimes inclusively referred to as "carboxyalkyl cellulose".

The degree of etherification of the carboxyalkyl cellulose is, for example, 0.23 or more, preferably 0.25 or more, and more preferably 0.3 or more. The degree of etherification is, for example, 0.7 or less, preferably 0.6 or less, and more preferably 0.55 or less. These lower limits and upper limits can be appropriately selected and combined. The degree of etherification may be, for example, 0.23 to 0.7, 0.25 to 0.7, or 0.3 to 0.7.

In the carboxyalkyl cellulose having a degree of etherification in the range as above, due to comparatively many hydroxyl groups remaining in the molecular chains, pseudo cross-linking points via hydrogen bonds between the molecular chains are likely to increase. This facilitates gelation, increasing the proportion of gelled substance. In gelled regions, the gelled substance is swollen with water contained in the dispersion medium in the negative electrode material mixture slurry, but is unlikely to dissolve in water because the molecular chains of the carboxyalkyl cellulose are firmly immobilized. Therefore, in the applied film of negative electrode material mixture slurry, the gelled substance is present with its shape kept unchanged. As the applied film dries, the gelled substance releases the dispersion medium such as water, and shrinks. This can form the pores more effectively.

When the carboxyalkyl cellulose has a degree of etherification within the above range, the viscosity of the negative electrode material mixture slurry is unlikely to increase too much, and the application workability is unlikely to be lowered. Therefore, the bonding property in negative electrode material mixture layer can be easily enhanced.

The degree of etherification is an index to show how much amount of hydroxyl groups of the cellulose in a cellulose ether compound is etherified by substitution. For example, in a carboxyalkyl cellulose, it is specifically an index to show the amount of ether groups which are formed by substitution by a carboxyalkyl group or a salt thereof such as a carboxymetyl group or sodium carboxymetyl group ($-CH_2COONa$), among the ether groups contained in the cellulose ether compound. Note that a cellulose has three hydroxyl groups per anhydroglucose unit. When one hydroxyl group is etherified in each of the all anhydroglucose units, the degree of etherification is 1 (one). Therefore, the degree of etherification of the cellulose compound is in the range of 0 to 3.

The average degree of polymerization of the carboxyalkyl cellulose is, for example, 20 or more, preferably 80 or more (e.g., 100 or more), and more preferably 500 or more (e.g., 700 or more, or 1000 or more). The average degree of polymerization is, for example, 1600 or less, preferably 1500 or less (e.g., 1300 or less), and more preferably 1200 or less. These lower limits and upper limits can be appropriately selected and combined. The average degree of polymerization may be, for example, 20 to 1600, 20 to 1200, or 500 to 1200.

The degree of etherification of the carboxyalkyl cellulose as above is lower than those of carboxyalkyl celluloses typically used for the negative electrode material mixture slurry. When the degree of etherification is low, the interaction between molecular chains of the carboxyalkyl cellulose tends to be strong, increasing the viscosity of negative electrode material mixture slurry. As a result, the application workability is likely to be lowered. Therefore, adjusting the average degree of polymerization within the above range is advantageous, because this can more effectively suppress the increase in the viscosity of negative electrode material mixture slurry, and suppress the lowering of the application workability. Furthermore, adjusting the average degree of polymerization within the above range is more effective for improving the bonding property.

The carboxyalkyl cellulose having a degree of etherification and an average degree of polymerization within the above range is partially dissolved in water and partially gelled and swollen with water. A solubility in water of the carboxyalkyl cellulose is preferably 90 to 97%. The solubility shows a proportion of dissolved components in the total mass of the carboxyalkyl cellulose. When the solubility is in such a range, the application workability of the negative electrode material mixture slurry is unlikely to be lowered, and the pores can be easily formed.

The component swellable with the dispersion medium such as the carboxyalkyl cellulose is preferably used in the form of particles. Such particles have an average particle size of, for example, 30 μm or more, preferably 35 μm or more, and more preferably 40 μm or more (e.g., 50 μm or more). The average particle size is, for example, 100 μm or less, preferably 90 μm or less, and more preferably 85 μm or less (e.g., 80 μm or less). These lower limits and upper limits can be appropriately selected and combined. The average particle size is, for example, 30 to 100 μm, 30 to 90 μm, or 40 to 80 μm. When the average particle size in such a range, the quantitative balance between the dissolved components and the gelled substance can be easily adjusted.

The carboxyalkyl cellulose may be a commercially available one, or one produced by a known method. The production method of the carboxyalkyl cellulose is described below by way of an example of CMC-Na.

CMC-Na is produced by allowing sodium monochloroacetate and sodium hydroxide to act on a cellulose-containing pulp. According to such a production method, CMC-Na is synthesized through the reaction of the hydroxyl group(s) in the cellulose with sodium monochloroacetate. The synthesized CMC-Na contains impurities such as sodium chloride, sodium carbonate, and sodium gluconate, which have incorporated during the production. It is preferable to remove such impurities by, for example, sulfuric acid purification method, methanol purification method, or water solvent method.

After impurities are removed, the CMC-Na is dried and then pulverized into a predetermined particle size. Pulverization may be performed by any known pulverizing method, using, for example, a jet mill, a pulverizer, an impact mill, or a hammer mill. Preferred among them is a jet mill.

The pulverized CMC-Na may be classified as needed. Examples of the classification method include gravity classification, centrifugal classification, and inertial classification. In view of obtaining powder having a small average particle size, preferred among them is centrifugal classification using a cyclone classifier.

Examples of the rubbery material used as the binder include: conjugated diene rubbers, such as polybutadiene and polyisoprene; copolymer rubbers of styrene and a conjugated diene (e.g., 1,3-butadiene, or isoprene), such as styrene-butadiene rubber (SBR); copolymer rubbers of acrylonitrile and the conjugated diene, such as acrylonitrile-butadiene rubber (NBR); acrylic rubbers; and modified products thereof. These rubbery materials may be used singly or in combination of two or more.

Examples of the modified products include: one that contains a primary constituent monomer unit of the above rubbery materials (e.g., in SBR, styrene and butadiene units), and another monomer unit capable of polymerization (a copolymerizable monomer unit); hydrides; and one in which another functional group is introduced. Examples of the copolymerizable monomer include: acrylonitrile; polymerizable unsaturated carboxylic acid, such as acrylic acid and methacrylic acid; esters of polymerizable unsaturated carboxylic acids (e.g., methyl acrylate, methyl methacrylate, ethyl acrylate, 2-ethylhexyl acrylate, and butyl acrylates). The copolymerizable monomer that can be used depends on the type of the rubbery material and is selected from those other than the primary constituent monomers of the rubbery materials.

Preferable rubbery materials are copolymer rubbers of styrene and a conjugated diene. Among them, SBR is particularly preferred as the binder for the negative electrode material mixture layer, because it usually has a glass transition point in the range of −30 to +40° C., exhibits good bonding property within the range of battery operating temperature, and is stable at the negative electrode potential. The copolymer rubber of styrene and a conjugated diene contains styrene units in an amount of, for example, 30 to 70 mol %, and preferably 40 to 65 mol %.

The rubbery material is preferably in the form of particles. The particles of the rubbery material (hereinafter sometimes simply referred to as "rubber particles") can be mixed in the form of an aqueous latex, emulsion, or suspension, to the negative electrode material mixture slurry.

The component swellable with the dispersion medium, such as CMC-Na, adheres to the surfaces of the negative electrode active material particles. The rubber particles have excellent bonding property, and allow the negative electrode active material particles with the above component adhering thereto to be bonded to each other, as well as to be bonded to the negative electrode core material by point-to-point contact.

The rubber particles have an average particle size of, for example, 50 to 200 nm, preferably 50 to 180 nm (e.g., 50 to 150 nm), and more preferably 100 to 170 nm (e.g., 100 to 120 nm). When the average particle size of the rubber particles is in such a range, the bonding property in the negative electrode material mixture layer can be more effectively enhanced.

The amount of the binder is, for example, 1 to 7 parts by mass, preferably 1.5 to 5 parts by mass, and more preferably 1.7 to 4 parts by mass, relative to 100 parts by mass of the negative electrode active material particles. When the amount of the binder is in such a range, the battery capacity can be easily increased, and the pore can be easily formed. Moreover, the increase in internal resistance can be suppressed. Therefore, the deterioration in input-output characteristics can be more effectively suppressed.

When the binder contains the component swellable with the dispersion medium, such as CMC-Na, the amount of the component is, for example, 0.8 to 3 parts by mass, preferably 0.8 to 2.8 parts by mass (e.g., 0.9 to 2.7 parts by mass), and more preferably 0.8 to 1.5 parts by mass, or 1 to 2 parts by mass, relative to 100 parts by mass of the negative electrode active material particles. When the amount of the component is in such a range, the battery capacity can be easily increased, and the pore can be more effectively formed. This is advantageous in enhancing the input-output characteristics.

When the binder includes the rubbery material, the amount of the rubbery material is, for example, 0.5 to 1.5 parts by mass, and preferably 0.6 to 1.2 parts by mass, relative to 100 parts by mass of the negative electrode active material particles. When the amount of the rubbery material is in such a range, it is possible to easily enhance the bonding property, and easily prevent the negative electrode active material particles from being excessively coated with the rubbery material. Thus, the increase in internal resistance can be more effectively suppressed.

The negative electrode material mixture layer may further include an electrically conductive agent and/or a thickener, if necessary. Examples of the conductive agent include: carbon blacks; conductive fibers, such as carbon fibers; and fluorinated carbons. Examples of the thickener include poly $C_{2-4}$ alkylene glycols, such as polyethylene glycol.

An apparent density of the negative electrode material mixture layer is not particularly limited. In the present invention, the negative electrode material mixture layer has pores of appropriate sizes in an appropriately distributed state. Therefore, even when the apparent density of the negative electrode material mixture layer is high, the penetration of non-aqueous electrolyte is good, allowing to maintain excellent electrolyte permeability. Accordingly, the input-output characteristics (or discharge load characteristics) can be enhanced. For example, when the negative electrode active material is a carbonaceous material having a graphite structure, the apparent density of the negative electrode material mixture layer (the apparent density of the negative electrode material mixture layer excluding pores) is, for example, 1.5 to 1.8 g/cm³, and preferably 1.55 to 1.75 g/cm³.

The apparent density of the negative electrode material mixture layer excluding pores can be calculated by dividing the weight of the negative electrode material mixture layer by the volume of a non-porous portion of the negative electrode material mixture layer. Specifically, the apparent density of the negative electrode material mixture layer excluding pores can be calculated, for example, as follows.

The negative electrode is cut in a predetermined size (e.g., 1 cm×1 cm), to measure the weight and thickness of it. From the measured weight, the weight of the core material is subtracted, to obtain a negative electrode material mixture layer weight w per cm² (g/cm²). On the other hand, from the thickness of the cut negative electrode, the thickness of the core material is subtracted, to obtain a thickness t (cm) of the negative electrode material mixture layer, from which the volume of the negative electrode material mixture layer (=1× 1×t=t (cm³)) is determined. Using the w and t, and the number density, average maximum length, and average maximum diameter of the pores calculated by the aforementioned methods, an apparent density d (g/cm³) can be calculated from the formula below.

$$d=w/\{t-(\pi R_2^{3/2}L_2^{3/2}n)/6-(\pi R_1^{3/2}H^{3/2}N)/3\sqrt{2}\},$$

where $R_2$ is the average maximum diameter of the voids, $L_2$ is the average maximum length of the voids, n is the number density of the voids at a cross section in the plane direction of the negative electrode material mixture layer, $R_1$ is the average maximum diameter of the openings of the recesses, H is the average maximum depth of the recesses, and N is the number density of the recesses at the surface of the negative electrode material mixture layer.

Note that when the recesses or grooves are formed as conventionally, by pressing with a die or the like, the packing density of the negative electrode active material is locally increased in and around the pressed portion, to cause the apparent density to vary in a region excluding the pores of the negative electrode material mixture layer. In contrast, in the present invention, the pores are formed during drying of the applied film of negative electrode material mixture slurry. Therefore, the apparent density is unlikely to vary, throughout an entire region excluding the pores of the negative electrode material mixture layer.

The variations in apparent density in a region excluding the pores of the negative electrode material mixture layer are, for example, less than 1%, and preferably less than 0.7% of an average value of the apparent density.

Specifically, a plurality of points (e.g., 20 points) are randomly selected in the negative electrode material mixture layer. The apparent densities at the points are measured as mentioned above, and an average of the measured values is calculated. The variations in apparent density can be evaluated from the difference between the average value and the largest or smallest of the measured values of the apparent density.

The thickness (average thickness T) of the negative electrode material mixture layer is not particularly limited, and, for example, 30 to 200 μm, and preferably about 50 to 150 μm.

A ratio L/T of the average maximum length L of the pores (i.e., the average maximum depth H of the recesses) to the average thickness T of the negative electrode material mixture layer is, for example, 0.4 or more, preferably 0.5 or more, and more preferably 0.55 or more. The ratio L/T is, for example, 1 or less, preferably 0.9 or less, and more preferably 0.8 or less (e.g., 0.75 or less). These lower limits and upper limits can be appropriately selected and combined. The ratio L/T may be, for example, 0.4 to 1, or 0.4 to 0.8. The ratio L/T within such a range is more effective for improving the electrolyte permeability.

The negative electrode core material sheet may be any core material sheet conventionally used for the negative electrode for lithium ion secondary batteries.

An exemplary material of the negative electrode core material sheet is copper, a copper alloy, stainless steel, or nickel. Preferred among them are copper and a copper alloy. The copper alloy contains a component other than copper in an amount of, for example, 0.2 mol % or less.

The negative electrode core material sheet may be a non-porous electrically conductive substrate, or a porous electrically conductive substrate having a plurality of through-holes. Examples of the non-porous conductive substrate include metal foil and metal sheet. Examples of the porous conductive substrate include metal foil having communicating holes (perforated holes), mesh, punched sheet, and expand metal.

Preferred examples of the negative electrode core material sheet include copper foil, and a more preferred example thereof is electrolytic copper foil.

The negative electrode core material sheet has a thickness of, for example, 5 to 30 μm, and preferably about 5 to 15 μm.

The negative electrode material mixture layer may be formed on one surface or both surfaces of the negative electrode core material sheet.

(Production Method of Negative Electrode)

The negative electrode of the present invention is formed by applying a negative electrode material mixture slurry onto a surface of a negative electrode core material sheet, drying the applied film, and pressing the applied film after drying.

Specifically, the negative electrode can be produced through the steps of:

(i) preparing a negative electrode material mixture slurry including negative electrode active material particles, a binder, and a dispersion medium;

(ii) applying the negative electrode material mixture slurry onto a negative electrode core material sheet, to form an applied film;

(iii) drying the applied film by heating; and (iv) pressing the applied film after drying, to form a negative electrode material mixture layer supported on the negative electrode core material sheet.

The pores of the negative electrode material mixture layer are formed through the step of drying the applied film. The size, shape, number density, and the like of the pores can be adjusted by, for example, controlling the drying conditions, or selecting the type, physical properties, amount, and average particle size of the binder, the average particle size of the negative electrode active material particles, and/or the type of the dispersion medium. Therefore, unlike in the conventional method, the step of forming recesses or the like is not necessary, and the negative electrode can be produced in a simple and easy manner.

In order to efficiently form pores on the surface and in the interior of the negative electrode material mixture layer, it is preferable to use a binder containing a component swellable with the dispersion medium, such as CMC-Na. Particularly when using, as such a component, a CMC-Na whose degree of etherification and average degree of polymerization are within in the range as above, pores of appropriate sizes can be formed, and the number density of the pores can be easily controlled. In view of further enhancing the bonding property, it is preferable to use a binder containing a CMC-Na and a rubbery material.

In the step (i), the negative electrode material mixture slurry can be prepared by mixing negative electrode active material particles, a binder, and a dispersion medium. The negative electrode active material particles and/or the binder may be dispersed, in advance, in at least part of the dispersion medium. The mixing may be performed using a conventional mixer or kneader.

Examples of the dispersion medium include: water; alcohols, such as ethanol; ethers, such as tetrahydrofuran (THF); ketones, such as acetone; N-methyl-2-pyrrolidone (NMP); and mixed solvents thereof. When the binder contains a water-swellable component such as CMC-Na, the dispersion medium preferably contains at least water, and may be a mixed solvent of water and a water-soluble organic solvent (e.g., $C_{1-4}$ alkanol, such as ethanol; THF; acetone; or NMP).

The water content in the dispersion medium is, for example, 50 mass % or more, preferably 70 mass % or more, and more preferably 80 mass % or more.

A preferable viscosity of the negative electrode material mixture slurry is, for example, about 2,000 to 100,000 cP (=2 to 100 Pa·s).

When the negative electrode material mixture layer includes other components, such as an electrically conductive agent and a thickener, these components may be added in the step of preparing a negative electrode material mixture slurry.

In the step (ii), the negative electrode material mixture slurry is applied onto a surface of the negative electrode core material sheet, to form an applied film. In the application, any known application method using various coaters such as a die coater can be employed.

The amount of the applied negative electrode material mixture slurry (the thickness of the applied film) may be appropriately adjusted, depending on a desired thickness of the negative electrode material mixture layer and a desired packing density of the negative electrode active material.

In the step (iii), the applied film formed in the step (ii) is dried, thereby to remove the dispersion medium from the applied film. This step forms pores on the surface and in the interior of the negative electrode material mixture layer. As mentioned above, particularly when using a binder containing a component swellable with the dispersion medium, such as CMC-Na, pores can be efficiently formed on the surface and in the interior of the negative electrode material mixture layer.

The applied film may be naturally dried, but preferably is dried by heating and/or dried under reduced pressure.

The heating temperature may be appropriately selected, depending on the type of the dispersion medium, the ambient pressure during drying, and other factors. In the case of using a dispersion medium containing water, the heating temperature is, for example, 40 to 250° C., preferably 50 to 200° C., and more preferably 60 to 150° C.

The drying may be performed in air or in an inert gas atmosphere. The inert gas may be, for example, helium, neon, argon, krypton, xenon, or nitrogen.

The drying time may be appropriately selected, depending on the type of the dispersion medium, the drying temperature, the ambient pressure, and other factors, and is, for example, 1 to 20 hours, preferably 1.5 to 12 hours, and more preferably about 2 to 10 hours.

In the step (iv), the dried applied film obtained in the step (iii) is pressed together with the negative electrode core material sheet. The pressing may be performed using, for example, pressure rolls.

The linear pressure between pressure rolls can be appropriately selected so that the thickness of the negative electrode material mixture layer, the packing density of the negative electrode active material, and the like reach within the desired range, with the pores being held. The linear pressure is, for example, 0.2 to 1 kN/cm, preferably 0.3 to 0.8 kN/cm, and more preferably 0.4 to 0.7 kN/cm.

The number of times of pressing is, for example, 1 to 5 times, and preferably 1 to 3 times.

The negative electrode of the present invention is highly permeable to non-aqueous electrolyte, and can improve the input-output characteristics (or the discharge load characteristics). Therefore, it can be suitably used as a negative electrode for lithium ion secondary batteries.

(Lithium Ion Secondary Battery)

A lithium ion secondary battery includes a positive electrode, the aforementioned negative electrode, a separator interposed therebetween, and a non-aqueous electrolyte.

The lithium ion secondary battery is described below in more details, with reference to the drawings.

Figure 2:
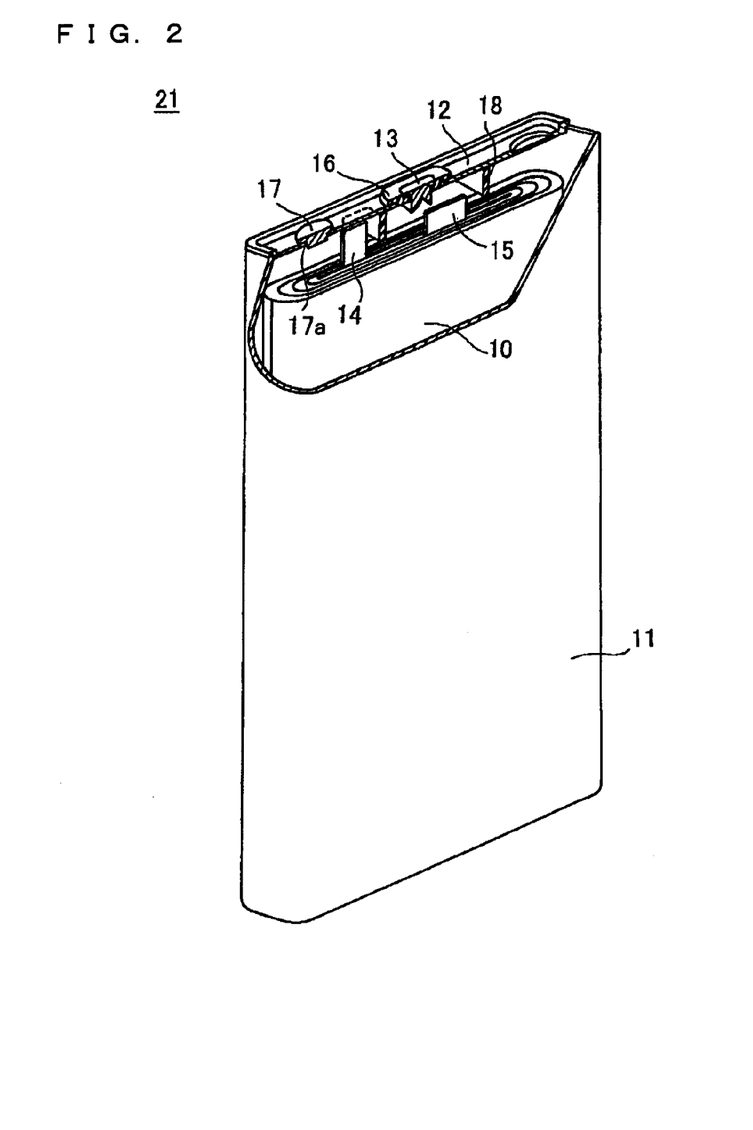

FIG. 2 is an oblique view schematically illustrating a lithium ion secondary battery according to one embodiment of the present invention. In FIG. 2, a battery 21 is partially cut away to show the essential part thereof. The battery 21 is a prismatic battery including a prismatic battery case 11 in which a flat electrode group 10 and non-aqueous electrolyte (not-shown) are housed.

The electrode group 10 is formed by spirally winding the aforementioned negative electrode and a positive electrode, with a separator interposed therebetween, and pressing them from the sides into a flat shape. One end of a positive electrode lead 14 is welded to an end portion of a positive electrode core material sheet constituting the positive electrode, and the other end of the positive electrode lead 14 is welded to a sealing plate 12 serving as a positive terminal. One end of a negative electrode lead 15 is welded to an end portion of a negative electrode core material sheet constituting the negative electrode, and the other end of the negative electrode lead 15 is welded to a negative terminal 13.

A gasket 16 is disposed between the sealing plate 12 and the negative terminal 13, providing electrical insulation therebetween. Between the sealing plate 12 and the electrode group 10, a frame member 18 made of an electrically insulating material such as polypropylene is usually disposed to insulate the negative electrode lead 15 from the sealing plate 12.

The sealing plate 12 is joined to the opening end of the prismatic battery case 11, and seals the prismatic battery case 11. The sealing plate 12 is provided with an injection port 17a. After non-aqueous electrolyte is injected into the prismatic battery case 11, the injection port 17a is closed with a sealing plug 17.

Constituent elements other than the negative electrode for lithium ion secondary batteries are specifically described below.

(Positive Electrode)

The positive electrode includes, for example, a positive electrode core material sheet, and a positive electrode material mixture layer supported on the positive electrode core material sheet.

The material of the positive electrode core material sheet may be any known one, for example, stainless steel, aluminum, an aluminum alloy, or titanium. Preferred among them are aluminum and an aluminum alloy. The positive electrode core material sheet may be a non-porous or porous electrically conductive substrate similar to those exemplified for the negative electrode core material sheet. A preferred example of the positive electrode core material sheet is aluminum foil.

The positive electrode core material sheet has a thickness of, for example, 5 to 30 μm, and preferably 7 to 20 μm.

The positive electrode material mixture layer may be formed on one surface or both surfaces of the positive electrode core material sheet. The thickness of the positive electrode material mixture layer may be selected from ranges similar to those of the negative electrode material mixture layer.

The positive electrode material mixture layer includes positive electrode active material particles and a binder as essential components, and includes an electrically conductive agent as an optional component.

The positive electrode active material may be any known positive electrode active material for lithium secondary batteries. Preferred among them are, for example, a lithium-containing composite oxide, and an olivine-type lithium phosphate.

The lithium-containing composite oxide is a metal oxide containing lithium and a transition metal element, or an oxide in which the transition metal element in the metal oxide is partially substituted by a hetero element. Examples of the transition metal element include Sc, Y, Mn, Fe, Co, Ni, Cu, and Cr. Preferred among these transition metal elements are, for example, Mn, Co, and Ni. Examples of the hetero element include Na, Mg, Zn, Al, Pb, Sb, and B. Preferred among these hetero elements are, for example, Mg, and Al. These transition metal elements may be used singly or in combination of two or more, and these hetero elements may be used singly or in combination of two or more.

Examples of the lithium-containing composite oxide include $Li_xCoO_2$, $Li_xNiO_2$, $Li_xMnO_2$, $Li_xCo_mNi_{1-m}O_2$, $Li_xCo_mM_{1-m}O_n$, $Li_xNi_{1-m}M_mO_n$, $Li_xMn_2O_4$, and $Li_xMn_{2-m}M_mO_4$, where M is at least one selected from the group consisting of Sc, Y, Mn, Fe, Co, Ni, Cu, Cr, Na, Mg, Zn, Al, Pb, Sb, and B; and x, m, and n are $0<x\leq1.2$, $0\leq m\leq0.9$, and $2.0\leq n\leq2.3$, respectively.

The lithium-containing composite oxide preferably contains Co and/or Ni. Preferable examples thereof are $Li_xCoO_2$, and $Li_xNiO_2$.

Another preferable example of the lithium-containing composite oxide is $Li_xNi_yM^1_zM^2_{1-(y+z)}O_{2+d}$ (1). In the formula (1), $M^1$ corresponds to the above element M, and is preferably at least one selected from the group consisting of Co and Mn. $M^2$ corresponds to the above element M, and is preferably at least one selected from the group consisting of Al, Cr, Fe, Mg, and Zn. In the formula (1), x, y, and d satisfy $0.98\leq x\leq1.1$, $0\leq z\leq0.7$, $0.9\leq(y+z)\leq1$, and $-0.01\leq d\leq0.01$.

Examples of the olivine-type lithium phosphate include $LiZPO_4$, and $Li_2ZPO_4F$, where Z is at least one selected from the group consisting of Co, Ni, Mn, and Fe.

The molar ratio of lithium in each of the above composition formulas is a value upon synthesis of the positive electrode active material, and is increased or decreased by charge and discharge. These positive electrode active materials may be used singly or in combination of two or more.

Examples of the binder include: fluorocarbon resins, such as polytetrafluoroethylene and polyvinylidene fluoride; acrylic resins, such as polymethyl acrylate; rubbery materials, such as SBR and acrylic rubbers; and mixtures of these.

Examples of the conductive agent include one similar to those exemplified above for the negative electrode material mixture layer, and graphite (e.g., natural graphite and artificial graphite).

The positive electrode material mixture layer may include a thickener, and a known additive, if necessary. Examples of the thickener include one similar to those exemplified for the negative electrode material mixture layer, and cellulose ether compounds, such as CMC and CMC-Na.

(Separator)

The separator may be a resin microporous film, or a resin non-woven or woven fabric. Examples of the resin constituting the separator include: polyolefins, such as polyethylene and polypropylene; polyamides; polyamide-imides; and polyimides.

The separator has a thickness of, for example, 5 to 50 μm, and preferably 10 to 30 μm.

(Non-Aqueous Electrolyte)

The non-aqueous electrolyte includes a non-aqueous solvent, and a lithium salt dissolved in the non-aqueous solvent.

Examples of the non-aqueous solvent include: cyclic carbonic acid esters, such as propylene carbonate and ethylene carbonate (EC); chain carbonic acid esters, such as diethyl carbonate, ethyl methyl carbonate (MEC), and dimethyl carbonate; and cyclic carboxylic acid esters, such as γ-butyrolactone and γ-valerolactone. These non-aqueous solvents may be used singly or in combination of two or more.

Examples of the lithium salt include: $LiPF_6$, $LiBF_4$, $LiSbF_6$, $LiAsF_6$, $LiClO_4$, $LiAlCl_4$, $LiSCN$, $LiCF_3CO_2$, $LiCF_3SO_3$, $LiN(SO_2CF_3)_2$, $LiN(SO_2C_2F_5)_2$, and $LiC(SO_2CF_3)_3$. These lithium salts may be used singly or in combination of two or more.

The lithium salt concentration in the non-aqueous electrolyte is, for example, 0.5 to 2 mol/L.

Any known additive may be added to the non-aqueous electrolyte. Examples of the additive include: vinylene carbonate compounds, such as vinylene carbonate (VC); cyclic carbonate compounds having a vinyl group, such as vinyl ethylene carbonate and divinylethylene carbonate; and aromatic compounds, such as cyclohexylbenzene, biphenyl, and diphenyl ether.

(Others)

The shape of the lithium ion secondary battery is not limited to prismatic, and may be, for example, cylindrical, coin-shaped, or flat. The lithium ion secondary battery may be a laminate-type battery.

The material of the battery case may be, for example, stainless steel, aluminum, and an aluminum alloy (an alloy containing a small amount of metal such as manganese or copper), and may be, for example, a laminated film formed by sandwiching a metal layer such as an aluminum layer between resin films.

The electrode group is not necessarily formed by winding, and may be formed by stacking or zigzag folding the positive electrode, the negative electrode, and the separator interposed therebetween, depending on the shape of the battery. The shape of the electrode group is not limited to flat, and may be cylindrical, depending on the shape of the battery or battery case.

EXAMPLES

Next, the present invention is specifically described by way of Examples and Comparative Examples. The following Examples, however, are not to be construed as limiting in any way the scope of the present invention.

Example 1

(1) Production of CMC-Na Powder

Pulp chips were shredded into pulp powder, using a shredder (Biaxial shredder, TIGER SHRED, available from Fujitex Corporation). Subsequently, 191 g of the pulp powder was added to 5730 mL of an aqueous 88 mass % 2-propanol solution, and mixed together while being stirred at 45° C., thereby to prepare a slurry. After the slurry was naturally cooled to room temperature, 13.7 g of sodium hydroxide was added thereto, to produce alkali cellulose. The slurry of alkali cellulose was cooled with ice to 10° C. or less. Next, 31.4 g of monochloroacetic acid was added to the cooled slurry of alkali cellulose, and stirred for 5 minutes. The slurry was then cooled to 5° C., and left to stand for 2 hours.

The resultant slurry was placed in a flask, and boiled in a hot water bath to allow reaction to proceed at the boiling point for 80 minutes. Subsequently, 5 mass % hydrochloric acid was added in excess into the flask, and stirred for 5 minutes, and the slurry was cooled to room temperature. The resultant slurry was washed with an aqueous methanol solution (methanol concentration: 80 mass %), and then filtered. The washing and filtering were repeated 5 times in total, to remove chloride ions. The residual substance was dried at 80° C. for 3 hours, and a CMC-Na solid was thus obtained.

The CMC-Na solid was pulverized, using a jet mill (100AFG available from Hosokawa Micron Corporation), and then passed through a 120-μm mesh screen, into a CMC-Na powder having a maximum particle size of 120 μm (average particle size: 60 μm). The degree of etherification of the resultant CMC-Na was 0.4, and the average degree of polymerization thereof was 1200.

(2) Preparation of Negative Electrode Material Mixture Slurry

The CMC-Na powder thus obtained was mixed with an appropriate amount of water. Next, natural graphite (average particle size: 20 μm) serving as a negative electrode active material, the mixture containing CMC-Na powder (solid content concentration: 1 mass %), and an aqueous dispersion containing SBR (available from JSR Corporation, SBR content: 48 mass %, average particle size of SBR: 150 nm, glass transition point: 25° C.) were mixed, to prepare a negative electrode material mixture slurry. The amounts of CMC-Na powder and SBR were respectively 1 part by mass, relative to 100 parts by mass of natural graphite.

(3) Fabrication of Negative Electrode

The negative electrode material mixture slurry prepared in (2) above was applied onto both surfaces of an electrolytic copper foil (thickness: 10 μm) serving as a negative electrode core material sheet, using a die coater. The applied film was dried at 60° C. for 10 hours. The dried applied film was pressed together with the negative electrode core material sheet between pressure rolls at a linear pressure of 490 N/cm, thereby to form a negative electrode material mixture layer. The negative electrode thus obtained was cut in a predetermined shape.

The thickness of the resultant negative electrode material mixture layer was 120 μm, and the apparent density thereof in the region excluding the pores was 1.6 g/cm$^3$.

(4) Fabrication of Positive Electrode

One hundred parts by mass of $LiCoO_2$ serving as a positive electrode active material, 4 parts by mass of PVDF serving as a binder, and an appropriate amount of NMP were mixed, to prepare a positive electrode material mixture slurry. The positive electrode material mixture slurry was applied onto both surfaces of an aluminum foil (thickness: 15 μm) serving as a positive electrode core material sheet, and dried and pressed, thereby to form a positive electrode material mixture layer. The positive electrode thus obtained was cut in a predetermined shape. In the resultant positive electrode, the thickness of the positive electrode material mixture layer was 100 μm.

(5) Preparation of Non-Aqueous Electrolyte $LiPF_6$ was dissolved at a concentration of 1 mol/L in a non-aqueous solvent containing EC and MEC in a volume ratio of 30:70, thereby to prepare a non-aqueous electrolyte. VC was added as an additive to the non-aqueous electrolyte. The VC concentration in the non-aqueous electrolyte was set to 3 mass %.

(6) Assembling of Battery

A prismatic lithium ion secondary battery as illustrated in FIG. 2 was fabricated in the following manner.

The negative electrode and the positive electrode obtained in (3) and (4) above were wound with a separator (polyethylene microporous film, A089 available from Celgard Inc., thickness: 20 μm) interposed therebetween, which were then pressed from the sides, into a flat electrode group having an approximately oval cross section. Here, one end of a positive electrode lead was welded to the positive electrode, and one end of a negative electrode lead was welded to the negative electrode.

The electrode group was placed in a prismatic battery case made of aluminum. The battery case has a bottom and a side wall, with the top open. The principal flat portions of the side wall were rectangular in shape and 80 μm in thickness. On top of the electrode group, an electrically insulating frame member was disposed for preventing a short circuit between the negative electrode lead, and the battery case and sealing plate.

The other end of the positive electrode lead extended from the electrode group was welded to an approximately rectangular sealing plate. The sealing plate has a negative terminal provided at its center portion, and between the negative terminal and the sealing plate, a gasket for electrically insulating them from each other is provided. The other end of the negative electrode lead extended from the electrode group was welded to the negative terminal.

Subsequently, the sealing plate was disposed at the opening of the battery case, and laser-welding was applied to the peripheries of the sealing plate and the opening of the battery case, thereby to seal the battery case. The sealing plate has an injection port for non-aqueous electrolyte, and 2.5 g of non-aqueous electrolyte was injected through the injection port into the battery case. The injection port was closed with a sealing plug by welding. In that manner, a prismatic lithium ion secondary battery was obtained. The lithium ion secondary battery was 50 mm in height and 34 mm in width. The thickness of the internal space of the battery was 5.2 mm. The design capacity of the battery was 850 mAh.

With regard to (I) the physical properties of the CMC-Na powder, (II) the negative electrode material mixture layer, and (III) the battery characteristics, evaluation was performed as follows.

(I) Physical Properties of CMC-Na Powder

The degree of etherification, average degree of polymerization, and average particle size of the CMC-Na powder were measured by the methods below.

<Measurement of Degree of Etherification>

The degree of etherification can be determined by boiling a calcined sample in sulfuric acid, adding phenolphthalein indicator thereto, and performing a back titration of excessive acid with potassium hydroxide. A detailed description is given below.

First, an alkalinity A of CMC-Na was measured.

Specifically, 1 g of CMC-Na powder was dissolved in 200 ml of water in a flask. To this solution, 5 mL of 0.05 mol/mL sulfuric acid was added, and boiled for 10 minutes. After boiling, the solution was cooled to room temperature. To the resultant solution, phenolphthalein indicator was added, and titrated with an aqueous 0.1 mol/mL potassium hydroxide solution.

A blank test was performed in a manner similar to the above, without adding CMC-Na powder. Using the results of titration and blank test, the alkalinity A was calculated from the following formula (a):

$$A = (e - d_a) f / M_a \tag{a}$$

e: the volume (mL) of the aqueous potassium hydroxide solution required for titration in the blank test $d_a$: the volume (mL) of the aqueous potassium hydroxide solution required for titration of the solution of CMC-Na and sulfuric acid f: the titer (g/mL) of aqueous potassium hydroxide solution $M_a$: the mass of CMC-Na powder Next, a degree of etherification DS was measured in the following manner.

The CMC-Na powder in an amount of 0.5 g was calcined. The calcined substance was placed in a beaker, together with 250 mL of water and 35 mL of 0.05 mol/mL sulfuric acid, and then boiled for 30 minutes. After cooled to room temperature, the resultant solution was titrated with an aqueous 0.1 mol/mL potassium hydroxide solution.

The degree of etherification DS was calculated from the following formulas (b) and (c):

$$DS = 162W / (10000 - 80W) \tag{b}$$

$$W = (af' - bf) / M_a - A \tag{c}$$

a: the volume (mL) of sulfuric acid f': the titer (g/mL) of sulfuric acid b: the volume (mL) of the potassium hydroxide required for titration f, A, and $M_a$ are the same as above.

<Measurement of Average Degree of Polymerization>

First, a limiting viscosity η was determined, using a capillary viscometer (Cannon-Fenske type, available from Kusano Science Corporation). The determined value was substituted in the formula (d) below to calculate a mass-average molecular weight $M_m$. The mass-average molecular weight $M_m$ was then converted to an average degree of polymerization.

$$\eta = 6.46 \times 10^{-16} \times M_m \tag{d}$$

<Measurement of Average Particle Size>

Using a dispersion prepared by dispersing the dry CMC-Na powder in ethanol, a particle size at a cumulative volume of 50% in a volumetric particle size distribution (average particle size: $D_{50V}$) was determined, with a laser diffraction-scattering type particle size distribution analyzer (Microtrac available from Nikkiso Co., Ltd.).

(II) Negative Electrode Material Mixture Layer

The pore (recess and void) size, the pore number density, the negative electrode material mixture layer apparent density and variations therein, the bonding strength, and the non-aqueous electrolyte permeability were evaluated in the following manner.

<Average Maximum Depth H of Recesses>

The negative electrode was embedded in epoxy resin, and cut to expose a cross section of the negative electrode material mixture layer in its thickness direction. The exposed surface was then chemically polished. The image of the polished surface was photographed (magnification: ×100) with an SEM (JSM-7800F, available from JEOL Ltd., accelerating voltage: 10 kV).

On the photographed image, 200 recesses were selected at random, and the maximum depth of each recess from the surface of the negative electrode material mixture layer was measured. An average of the measured values was calculated as an average maximum depth H.

<Pore Average Maximum Diameters $R_1$ and $R_2$, and Pore Number Density>

The images of the surface and a cross section in the plane direction of the negative electrode material mixture layer were photographed (magnification: ×100) with an SEM (JSM-7800F, available from JEOL Ltd., accelerating voltage: 10 kV).

On the photographed image of the surface, 200 pores (recesses) were selected at random, and the maximum diameter of the opening of each recess was measured. An average of the measured values was calculated as an average maximum diameter $R_1$.

On the photographed image of the cross section, 200 pores were selected at random, and the maximum diameter of each pore was measured. An average of the measured values was calculated as an average maximum diameter $R_2$.

Furthermore, on the photographed image of the surface, an arbitral region in the size of 1 cm×1 cm was selected. The number of pores present in the region was counted, to determine a number density.

<Negative Electrode Material Mixture Layer Apparent Density, and Variations>

The apparent density of the negative electrode material mixture layer excluding pores, and the variations therein were measured in the manner described above. Here, an average value of the apparent density was calculated from apparent densities measured at 20 points selected at random in the negative electrode material mixture layer, and using the average value as a reference value, the variations in apparent density were determined.

<Bonding Strength>

The bonding strength between negative electrode active material particles in the negative electrode material mixture layer was determined in the following manner.

First, a 2-cm-wide×3-cm-long test piece was cut out of the negative electrode. The negative electrode material mixture layer was removed only from one side of the test piece. The other side of the test piece with the negative electrode material mixture layer remaining thereon was stuck to the adhesive layer of a double-sided adhesive tape (product number: No. 515, available from Nitto Denko Corporation) stuck on a glass plate. Subsequently, the negative electrode core material sheet was peeled off from the test piece, to expose the negative electrode material mixture layer. In that manner, a measurement sample including the negative electrode material mixture layer adhering to one side of the double-sided adhesive tape was prepared.

The adhesive layer of the measurement sample, which was peeled off from the glass plate, was attached at the tip end of the measurement probe (tip end diameter: 0.2 cm) of a tacking tester (product name: TAC-II, available from RHESCA Co., Ltd.). A separation test was performed by pushing in and pulling up the measurement probe to and from the negative electrode material mixture layer of the measurement sample, under the conditions below, to measure a maximum load which caused separation of the active material particles from each other. The measured maximum load was divided by the cross-sectional area (0.031 cm²) of the measurement probe, thereby to determine a bonding strength (N/cm²) between the active material particles.

After the measurement of the bonding strength, the negative electrode sample used for measurement was removed from the measurement probe, and the exposed surface of the sample was observed. This confirmed that separation occurred between the active material particles.

Test conditions:
Probe push-in speed: 30 mm/min
Probe push-in duration: 10 sec
Probe push-in load: 3.9 N
Probe pull-up speed: 600 mm/min <Non-Aqueous Electrolyte Permeability>

An ability of the negative electrode material mixture layer to absorb electrolyte was evaluated as an index of the permeability of the negative electrode material mixture layer to non-aqueous electrolyte, in the following manner. Note that the permeability to non-aqueous electrolyte is the measure of the ease of movement of non-aqueous electrolyte within the negative electrode material mixture layer.

A 5-μL drop of non-aqueous electrolyte was placed on the surface of the negative electrode material mixture layer, to measure the time period it takes for the non-aqueous electrolyte to completely permeate the negative electrode material mixture layer. The non-aqueous electrolyte used here was prepared by dissolving $LiPF_6$ at a concentration of 1 mol/L in a non-aqueous solvent containing EC and MEC in a volume ratio of 30:70.

(III) Battery Evaluation

The prismatic lithium ion secondary battery was charged and discharged twice in an environment of 20° C. under the conditions below. Here, a value was calculated as the discharge load characteristics, by dividing the discharge capacity at the $2^{nd}$ cycle by the discharge capacity at the $1^{st}$ cycle.

($1^{st}$ Cycle)

Constant-current charge: charge current value 850 mA, charge cut-off voltage 4.2 V Constant-voltage charge: charge voltage value 4.2 V, charge cut-off current 100 mA Constant-current discharge: discharge current value 425 mA, discharge cut-off voltage 3.0 V ($2^{nd}$ Cycle)

Constant-current charge: charge current value 850 mA, charge cut-off voltage 4.2 V Constant-voltage charge: charge voltage value 4.2 V, charge cut-off current 100 mA Constant-current discharge: discharge current value 1700 mA, discharge cut-off voltage 3.0 V Examples 2 to 4 and Comparative Example 1

CMC-Na powders were produced in the same manner as in Example 1, except that in (1) Production of CMC-Na powder, the mesh size of the screen which coarse particles after pulverization were passed through was changed to 80 μm (Example 2), 160 μm (Example 3), 200 μm (Example 4), or 50 μm (Comparative Example 1). Negative electrodes and batteries were produced in the same manner as in Example 1 except for using the obtained CMC-Na powders, and subjected to the same evaluation as in Example 1.

Examples 5 and 6 and Comparative Examples 2 and 3

CMC-Na powders were produced in the same manner as in Example 1, except that in (1) Production of CMC-Na powder, the adding amounts of sodium hydroxide and monochloroacetic acid were changed. Negative electrodes and batteries were produced in the same manner as in Example 1 except for using the obtained CMC-Na powders, and subjected to the same evaluation as in Example 1.

The adding amount of sodium hydroxide was 12.7 g (Example 5), 8.6 g (Example 6), 29.1 g (Comparative Example 2), or 6.9 g (Comparative Example 3). The adding amount of monochloroacetic acid was 39.1 g (Example 5), 19.6 g (Example 6), 66.8 g (Comparative Example 2), or 15.7 g (Comparative Example 3).

Examples 7 and 8 and Comparative Examples 4 and 5

Negative electrodes and batteries were produced in the same manner as in Example 1 and subjected to the same evaluation as in Example 1, except that in (2) Preparation of negative electrode material mixture slurry, the amount of CMC-Na powder relative to 100 parts by mass of natural graphite was changed to 0.9 part by mass (Example 7), 2.7 parts by mass (Example 8), 0.5 part by mass (Comparative Example 4), or 3.5 parts by mass (Comparative Example 5).

Examples 9 and 10

CMC-Na powders were produced in the same manner as in Example 1, except that in (1) Production of CMC-Na powder, the period of time during which reaction was allowed to proceed at the boiling point was changed to 100 minutes (Example 9), or 7 minutes (Example 10). Negative electrodes and batteries were produced in the same manner as in Example 1 except for using the obtained CMC-Na powders, and subjected to the same evaluation as in Example 1.

The results of Examples and Comparative Examples are shown in Tables 1 and 2.

TABLE 2

| Comparative Example | 1 | 2 | 3 | 4 | 5 |
|---|---|---|---|---|---|
| CMC-Na | | | | | |
| Degree of etherification | 0.4 | 0.85 | 0.2 | 0.4 | 0.4 |
| Ave. degree of polymerization | 1200 | 1200 | 1200 | 1200 | 1200 |
| Maximum particle size (μm) | 50 | 120 | 120 | 120 | 120 |
| Ave. particle size (μm) | 24 | 60 | 60 | 60 | 60 |
| Blending ratio (part by mass) | 1 | 1 | 1 | 0.5 | 3.5 |
| Negative electrode material mixture layer | | | | | |
| Thickness (μm) | 120 | 120 | 120 | 120 | 120 |
| Ave. maximum depth H (μm) | 30 | 70 | 70 | 70 | 70 |
| Ave. diameter $R_1$ of opening (μm) | 30 | 70 | 70 | 70 | 70 |
| Ave. maximum diameter $R_2$ (μm) | 30 | 70 | 70 | 70 | 70 |
| Pore number density (pores/cm$^2$) | 12 | 5 | 20 | 5 | 36 |
| Apparent density (g/cm$^3$) | 1.6 | 1.6 | 1.6 | 1.6 | 1.6 |
| Variations in apparent density | <1% | <1% | <1% | <1% | <1% |
| Bonding strength (N/cm$^2$) | 158 | 86 | 32 | 80 | 96 |
| Electrolyte permeability (sec) | 90 | 87 | 72 | 71 | 31 |
| Discharge load characteristics (%) | 62 | 63 | 74 | 63 | 59 |

As evident from Table 1, in Examples 1 to 10, the non-aqueous electrolyte permeability was good, and the discharge load characteristics were high. In Examples 1 to 3, and 5 to 9, the bonding strength in the negative electrode material mixture was high.

In contrast, in Comparative Example 1 in which the pore average maximum diameter (average maximum diameters $R_1$ and $R_2$) was below 45 μm, the bonding strength was high, but the non-aqueous electrolyte permeability was poor, and the discharge load characteristics were low. In Comparative Examples 2 to 4 in which the pore number density was below 8 pores or above 17 pores, the non-aqueous electrolyte permeability was poor, and the discharge load characteristics were degraded. Particularly in Comparative Example 3, the bonding strength in the negative electrode material mixture layer was very low.

TABLE 1

| Example | 1 | 2 | 3 | 4 | 5 | 6 | 7 | 8 | 9 | 10 |
|---|---|---|---|---|---|---|---|---|---|---|
| CMC-Na | | | | | | | | | | |
| Degree of etherification | 0.4 | 0.4 | 0.4 | 0.4 | 0.37 | 0.25 | 0.4 | 0.4 | 0.4 | 0.4 |
| Ave. degree of polymerization | 1200 | 1200 | 1200 | 1200 | 1200 | 1200 | 1200 | 1200 | 1500 | 100 |
| Maximum particle size (μm) | 120 | 80 | 160 | 200 | 120 | 120 | 120 | 120 | 120 | 120 |
| Ave. particle size (μm) | 60 | 40 | 80 | 96 | 60 | 60 | 60 | 60 | 60 | 60 |
| Blending ratio (part by mass) | 1 | 1 | 1 | 1 | 1 | 1 | 0.9 | 2.7 | 1 | 1 |
| Negative electrode material mixture layer | | | | | | | | | | |
| Thickness (μm) | 120 | 120 | 120 | 120 | 120 | 120 | 120 | 120 | 120 | 120 |
| Ave. maximum depth H (μm) | 70 | 50 | 100 | 120 | 70 | 70 | 70 | 70 | 70 | 70 |
| Ave. diameter $R_1$ of opening (μm) | 70 | 50 | 100 | 120 | 70 | 70 | 70 | 70 | 70 | 70 |
| Ave. maximum diameter $R_2$ (μm) | 70 | 50 | 100 | 120 | 70 | 70 | 70 | 70 | 70 | 70 |
| Pore number density (pores/cm$^2$) | 12 | 12 | 12 | 12 | 10 | 15 | 10 | 15 | 12 | 12 |
| Apparent density (g/cm$^3$) | 1.6 | 1.6 | 1.6 | 1.6 | 1.6 | 1.6 | 1.6 | 1.6 | 1.6 | 1.6 |
| Variations in apparent density | <1% | <1% | <1% | <1% | <1% | <1% | <1% | <1% | <1% | <1% |
| Bonding strength (N/cm$^2$) | 147 | 156 | 140 | 86 | 149 | 121 | 140 | 191 | 160 | 72 |
| Electrolyte permeability (sec) | 45 | 45 | 42 | 30 | 44 | 35 | 49 | 32 | 50 | 49 |
| Discharge load characteristics (%) | 71 | 71 | 72 | 74 | 71 | 73 | 73 | 74 | 70 | 73 |

In Comparative Example 5 in which the pore number density exceeded 17 pores, the electrolyte permeability was good, and even though the pore number density was high, the bonding strength was not so much low since the amount of binder was comparatively large. In Comparative Example 5, however, the discharge load characteristics were degraded presumably because, due to the comparatively large amount of binder, the resistance during discharge was increased. For the similar reason, the discharge characteristics and battery capacity are likely to be degraded.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The negative electrode of the present invention is highly permeable to non-aqueous electrolyte, and therefore, when used in a lithium ion secondary battery, can improve the input-output characteristics of the battery. The lithium ion secondary battery including such a negative electrode is excellent in output characteristics, and therefore, can be used for various applications, for example, as a motor-driving power source for hybrid electric vehicles (particularly for plug-in hybrid cars), a driving power source for various portable electronic devices such as cellular phones, notebook personal computers, and video camcorders, or a large-size power source for household power storage system.

REFERENCE SIGNS LIST

1 Negative electrode core material sheet
2 Negative electrode material mixture layer
3 Negative electrode active material particle
4 Sodium salt of carboxymethyl cellulose
5 Rubber particles
6 Recess
7 Void
10 Electrode group
11 Prismatic battery case
12 Sealing plate
13 Negative terminal
14 Positive electrode lead
15 Negative electrode lead
16 Gasket
17 Sealing plug
17a Injection port
18 Insulating frame member
21 Lithium ion secondary battery

The invention claimed is:

1. A negative electrode for lithium ion secondary batteries, comprising:
a negative electrode core material sheet; and a negative electrode material mixture layer supported on the negative electrode core material sheet,
the negative electrode material mixture layer including negative electrode active material particles, and a binder,
the negative electrode material mixture layer having a plurality of pores interspersed on a surface and in an interior of the negative electrode material mixture layer,
the pores having an average maximum diameter R of 45 to 125 μm,
the pores having a number density of 8 to 17 pores per 1 $cm^2$ of the surface of the negative electrode material mixture layer or per 1 $cm^2$ of a cross section in a plane direction of the negative electrode material mixture layer.

2. The negative electrode for lithium ion secondary batteries according to claim 1, wherein
the pores include a plurality of recesses interspersed on the surface of the negative electrode material mixture layer, and a plurality of voids interspersed in the interior of the negative electrode material mixture layer, and
the recesses have an average maximum depth H of 45 to 125 μm.

3. The negative electrode for lithium ion secondary batteries according to claim 1, wherein
the binder includes a sodium salt of carboxymethyl cellulose, and
the sodium salt of carboxymethyl cellulose has a degree of etherification of 0.23 to 0.7, and an average degree of polymerization of 20 to 1600.

4. The negative electrode for lithium ion secondary batteries according to claim 3, wherein the negative electrode material mixture layer contains 0.8 to 3 parts by mass of the sodium salt of carboxymethyl cellulose, relative to 100 parts by mass of the negative electrode active material particles.

5. The negative electrode for lithium ion secondary batteries according to claim 3, wherein the sodium salt of carboxymethyl cellulose is in a form of particles having an average particle size of 30 to 100 μm.

6. The negative electrode for lithium ion secondary batteries according to claim 3, wherein the binder further includes a rubber material.

7. The negative electrode for lithium ion secondary batteries according to claim 6, wherein the rubber material is contained in an amount of 0.5 to 1.5 parts by mass in the negative electrode material mixture layer, relative to 100 parts by mass of the negative electrode active material particles.

8. The negative electrode for lithium ion secondary batteries according to claim 1, wherein variations in apparent density in a region excluding the pores of the negative electrode material mixture layer are less than 1% of an average value of the apparent density.

9. The negative electrode for lithium ion secondary batteries according to claim 1, wherein
a negative electrode active material constituting the negative electrode active material particles is a carbonaceous material having a graphite structure, and
an apparent density of the negative electrode material mixture layer excluding the pores is 1.5 to 1.8 $g/cm^3$.

10. A lithium ion secondary battery comprising:
a positive electrode; a negative electrode; a separator interposed between the positive electrode and the negative electrode; and a non-aqueous electrolyte,
the negative electrode being the negative electrode for lithium ion secondary batteries of claim 1.

* * * * *